R. H. S. BACON & R. REDPATH.
APPARATUS FOR AIMING GUNS.
APPLICATION FILED JUNE 24, 1912.

1,067,859.

Patented July 22, 1913.
8 SHEETS—SHEET 1.

Witnesses
P. J. Gathmann
M. E. Burrell

Inventors:
R. H. S. Bacon
Robert Redpath
By their Att'ys
Baldwin Wight

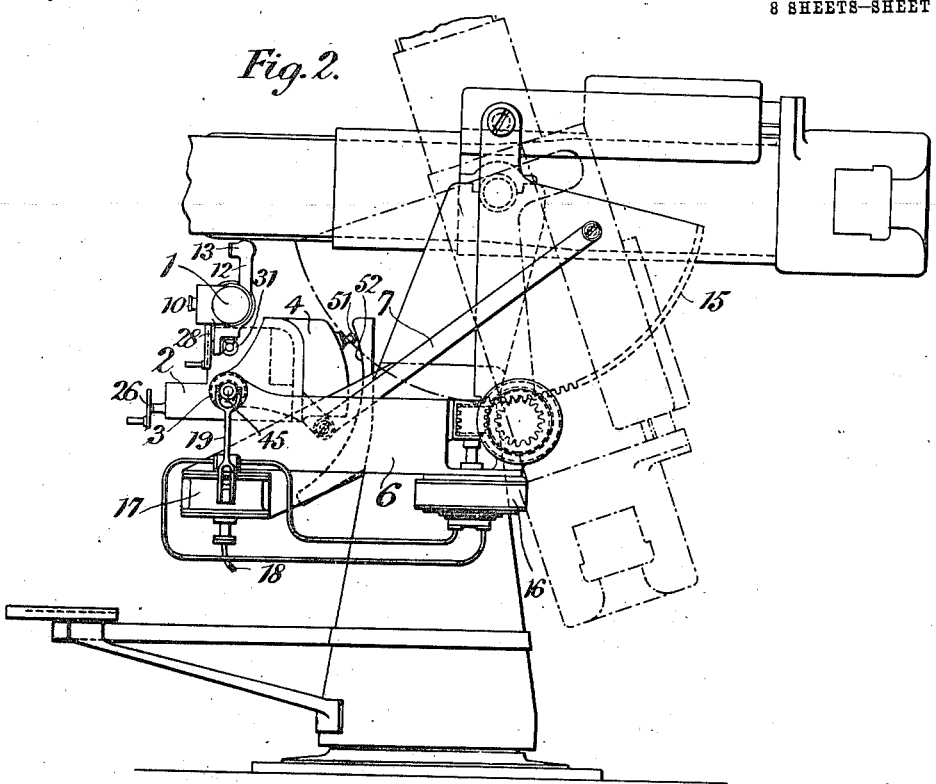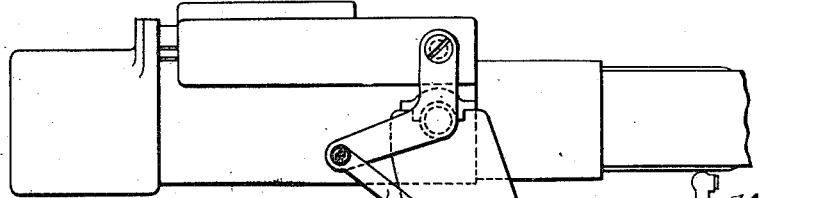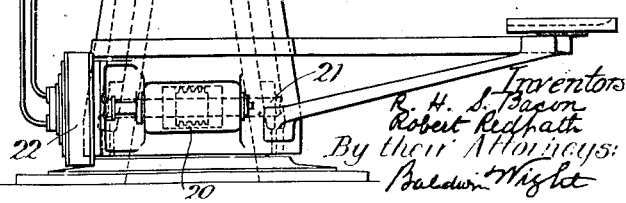

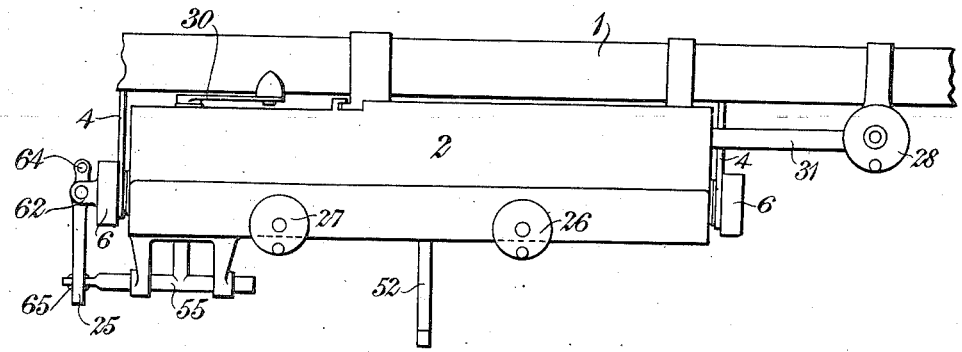
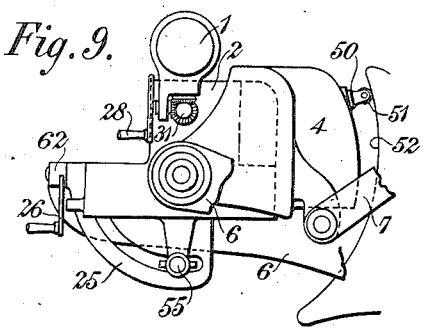 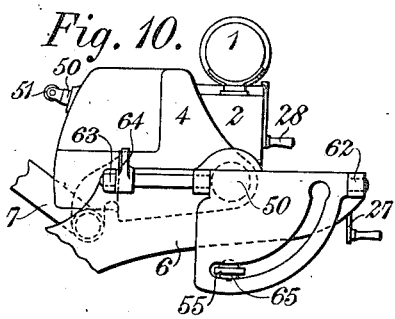
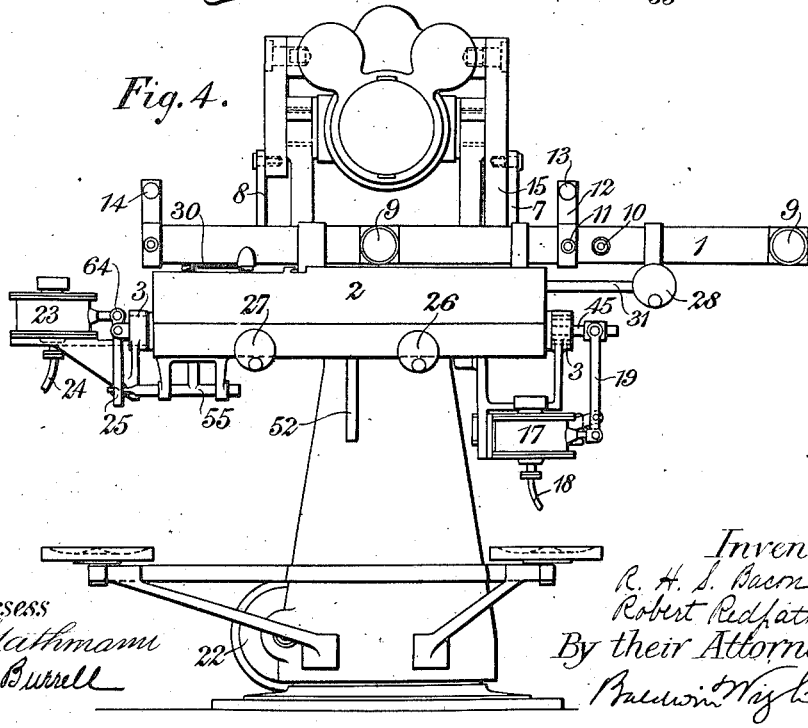

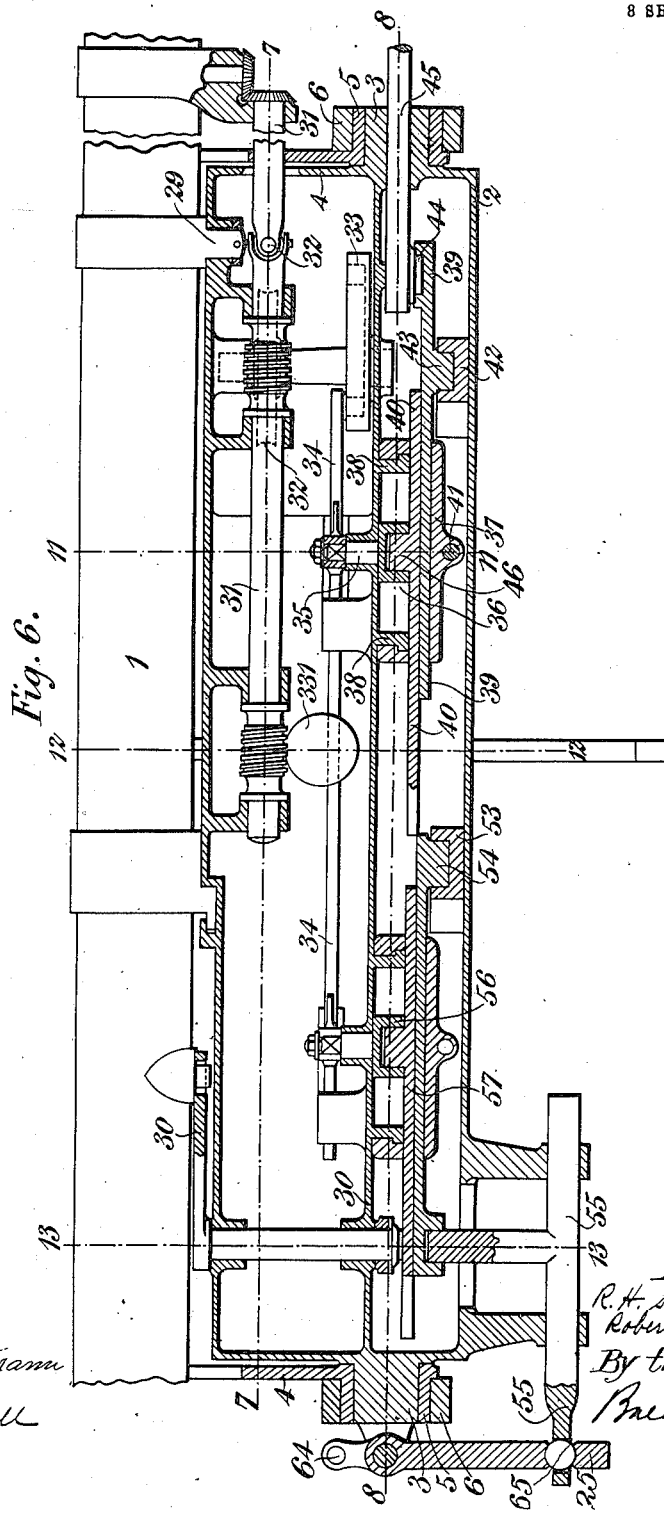

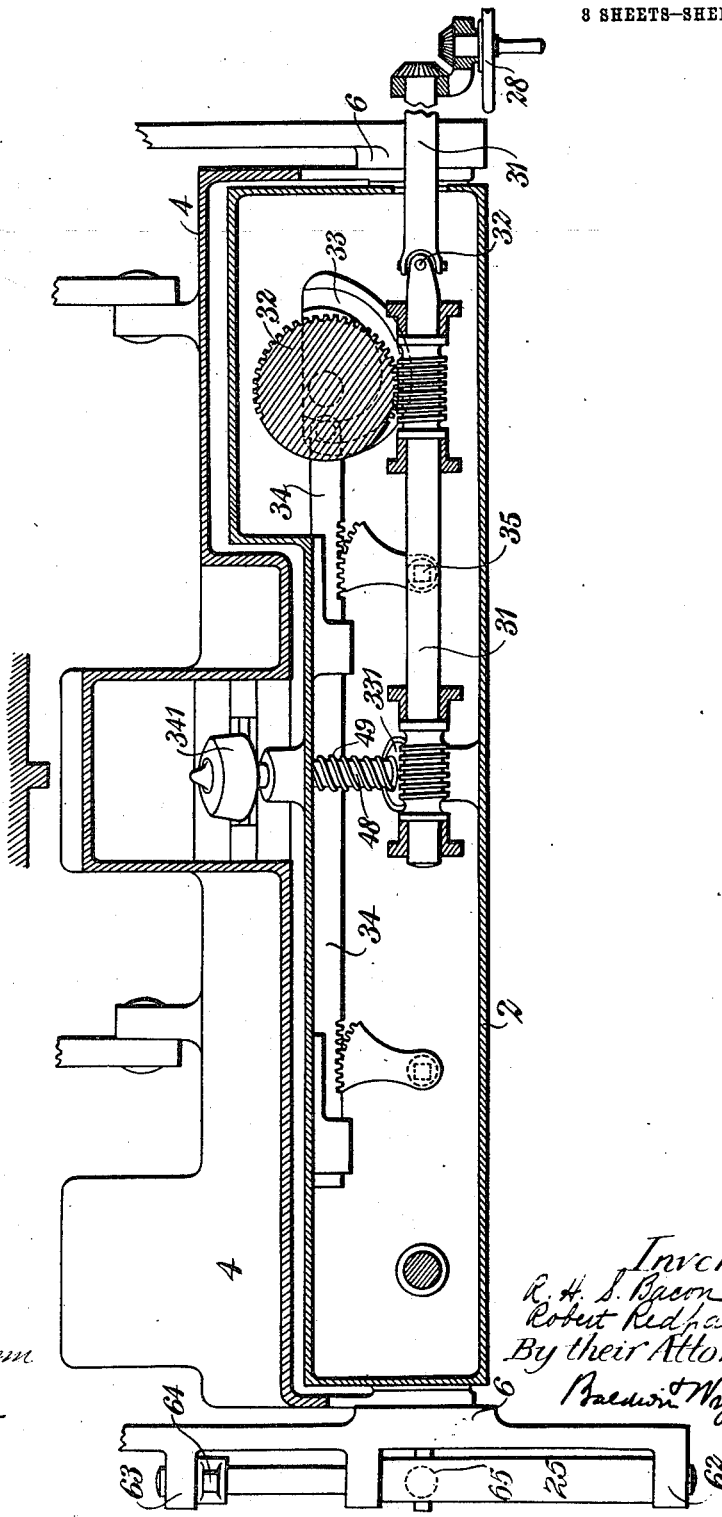

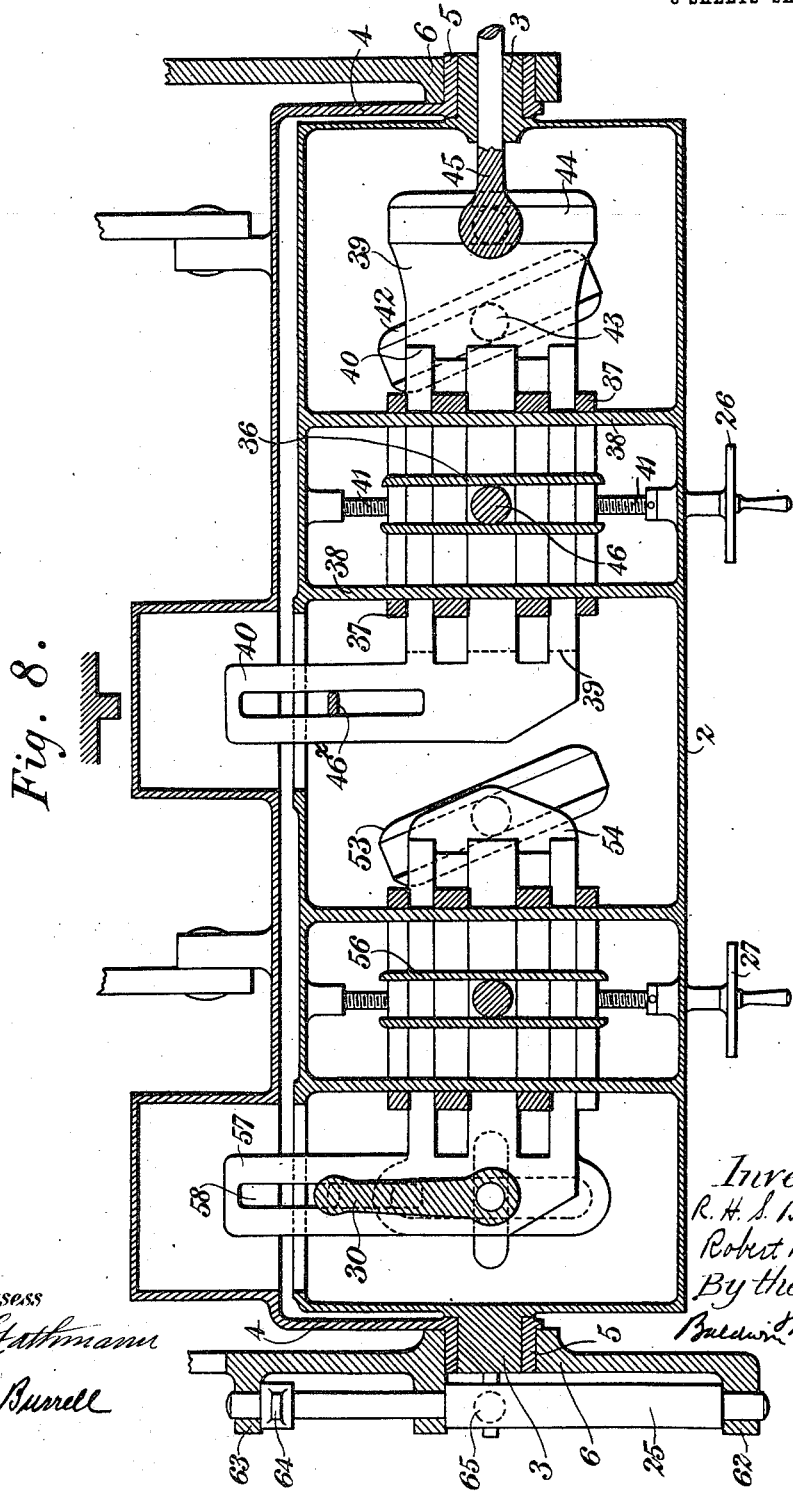

R. H. S. BACON & R. REDPATH.
APPARATUS FOR AIMING GUNS.
APPLICATION FILED JUNE 24, 1912.

1,067,859.

Patented July 22, 1913.
8 SHEETS—SHEET 7.

Witnesses
P. J. Gathmann
M. E. Burrell

Inventors:
R. H. S. Bacon
Robert Redpath
By their Attorneys:
Baldwin Wight

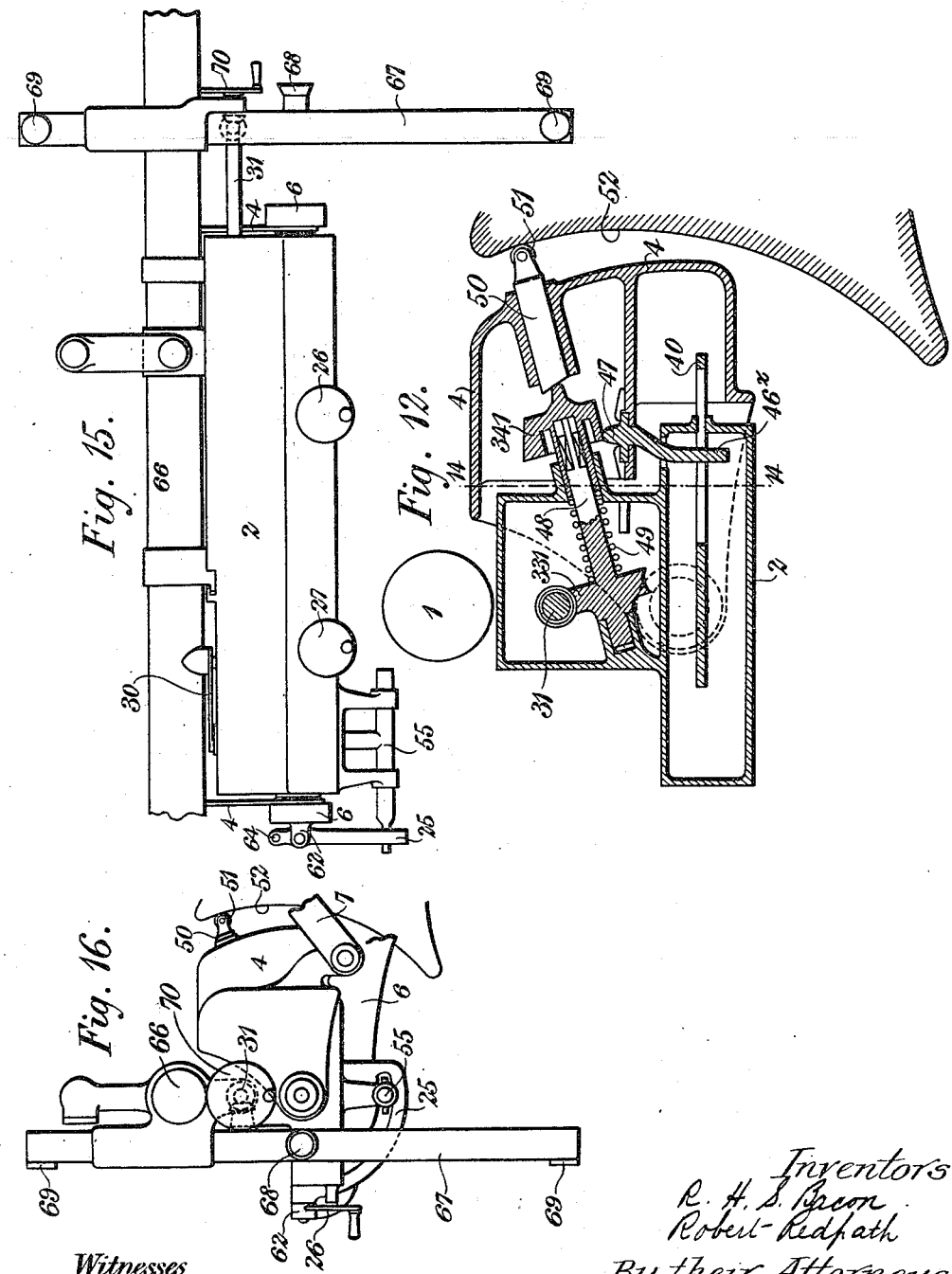

UNITED STATES PATENT OFFICE.

REGINALD H. S. BACON AND ROBERT REDPATH, OF COVENTRY, ENGLAND, ASSIGNORS TO THE COVENTRY ORDNANCE WORKS, LIMITED, OF COVENTRY, ENGLAND.

APPARATUS FOR AIMING GUNS.

1,067,859.   Specification of Letters Patent.   Patented July 22, 1913.

Application filed June 24, 1912. Serial No. 705,466.

*To all whom it may concern:*

Be it known that we, REGINALD HUGH SPENCER BACON and ROBERT REDPATH, subjects of the King of Great Britain, both residing at the Coventry Ordnance Works, Coventry, in the county of Warwick, England, have invented new and useful Improvements in Apparatus for Aiming Guns, of which the following is a specification.

Our invention relates to gun mountings and sights therefor, particularly to those intended to be used against rapidly moving targets, such as aeroplanes, torpedo boats, and the like, and has for its object means whereby the gun sights are automatically adjusted so as to give the correct angle between the axis of the gun and the line of sight for range and speed of target at all ranges within the radius of action of the gun.

According to this invention the sights move with the range finder which itself forms a part of the gun mounting and the act of laying the gun makes all the required corrections.

Figure 14:
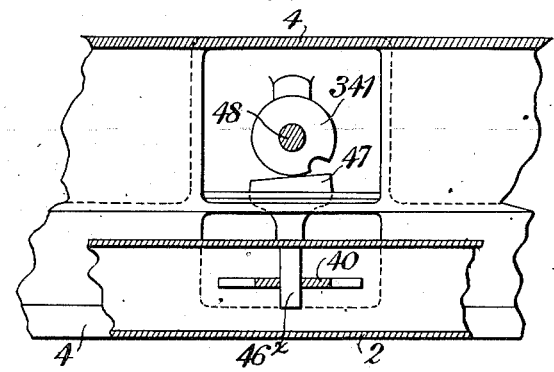
Figure 1:
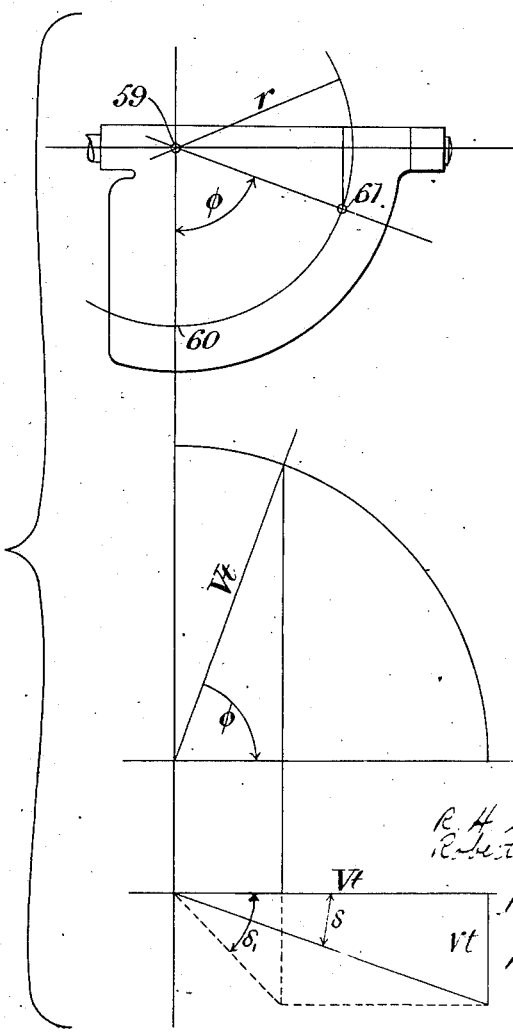
Figure 11:
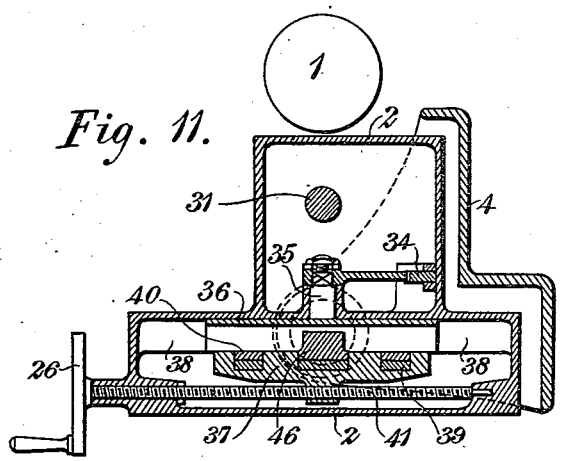
Figure 13:
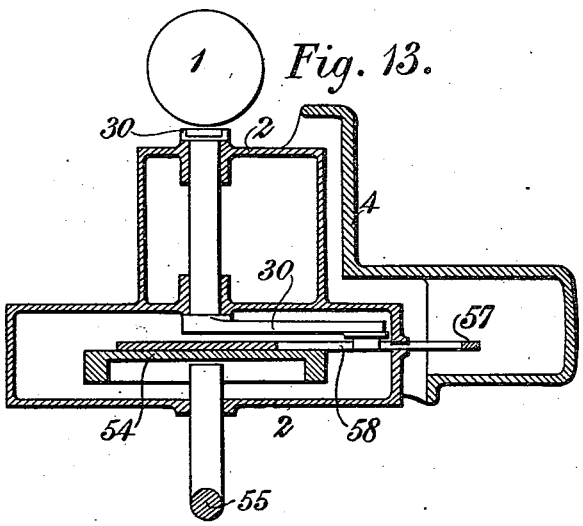

Figure 1 consists of diagrams explaining the invention. Fig. 2 is a left hand side elevation of a gun mounting fitted with our sighting gear. Fig. 3 is a right hand side elevation. Fig. 4 is a front elevation. Fig. 5 is a part front elevation of the sight setting and controlling gear to a larger scale than Figs. 2 to 4. Fig. 6 is a longitudinal vertical section of the same looking in the same direction. Fig. 7 is a sectional plan on the line 7—7, Fig. 6. Fig. 8 is a sectional plan on the line 8—8, Fig. 6. Fig. 9 is a part end elevation looking from the left hand side of the gun. Fig. 10 is a part end elevation looking from the right hand side of the gun. Figs. 11 to 13 are sections on the lines 11—11, 12—12, and 13—13, Fig. 6. Fig. 14 is a part longitudinal vertical section on the line 14—14, Fig. 12. Figs. 15 and 16 are views similar to Figs. 5 and 9 and showing a modification.

We will consider first with reference to Fig. 1 the case of a target moving in a plane approximately at right angles to the pivot of the gun mounting, and at right angles to the line of fire. The deflection angle, that is the angle between the projections of the gun's axis and the line of sight on the plane considered, is given by tan. $\delta = vt/Vt$ (or since $\delta$ is a small angle by $\delta = vt/Vt$) where $v$ = velocity of the target, $V$ = mean velocity of the projectile, (the vertical component being neglected) and $t$ = time of flight of projectile. Now, if the sights remain steadily on the target, i. e., if the gun is trained around its pivot with the same angular velocity as the target has with respect to the gun, $\delta$ is the angle trained through in time $t$ and therefore the angular velocity of gun and target $=\frac{\delta}{t}$ so that the angular velocity $\times$ the time of flight = the deflection angle, the angular velocity of the shot due to the rotation of the gun being negligible. If now we have on the mounting a member, the movement of which from a zero position is proportional to the speed and sense of training and if we compound this movement with a movement proportional to the time of flight of the projectile, we are furnished with a means of measuring the necessary deflection angle. It will be evident that the movement of a target in a plane at right angles to that just considered i. e. in a plane at right angles to the gun trunnions can be measured and allowed for in precisely the same manner.

It is convenient to keep the pivot, around which the gun is trained, always vertical independently of the altitude of the target, and when this altitude is considerable, as in the case of aeroplanes or balloons, it is evident that the angular velocity with respect to the axis of the pivot may be largely increased, all the other elements $v$, $V$, $t$ remaining as before.

Let $\varphi$ be the angle of elevation of the target with respect to the ground, see Fig. 1, then the projection of the line $Vt$ on the ground is $Vt$ cos. $\varphi$ and the angle moved through in the ground plane in time $t$ is $\delta_1 = vt/Vt$ cos. $\varphi$. But it is evident that the deflection angle between the gun and sights in the plane of fire is exactly as before, all the elements which determine this angle being unchanged. It is therefore necessary to multiply the angular velocity of the gun and target by cos. $\varphi$ to give the correct deflection angle when the gun is trained around its vertical pivot. In order to measure at any instant its correct time of flight, we employ a range finder, preferably of the well known coincidence type, mounted on the gun carriage and forming an integral part of the sighting gear. The operation of this range finder rotates cam gear so arranged as to give movements proportional to the range and also proportional to the time of flight of the projectile of the particular gun to which the gear is attached.

To measure the angular velocity we employ preferably a variable speed hydraulic transmitter which may be of any suitable type, the necessary power being taken from any convenient source; in smaller mountings we preferably employ two or more men to rotate a fly wheel and supply power for elevating and training.

If we employ a projectile fitted with time fuse we may mount on the sight in a convenient position an indicator or dial suitably graduated to show the time of flight corresponding to the range at which the sights are set for the purpose of setting said time fuse, or we may read this time from a scale in the range finder itself in the well known manner.

In Figs. 2 to 14, 1 is the range finder, mounted horizontally on the top of a box 2 which contains the sighting gear and is movable on trunnions 3 (see Fig. 6) relatively to a casting 4 which is itself movable around the same axis on trunnions 5. Both the box and the casting are supported by brackets 6, 6 fixed to the pivoting part of the mounting. The casting 4 is connected to the gun cradle by links 7 and 8 so that it rotates through the same angle as the gun in the vertical plane.

9 are the range finder windows, 10 the coincidence eye piece, 11 the eye piece of the reflecting telescope 12 with object glass 13.

14 is the eye piece of a reflecting telescope of known pattern carried on a suitable extension of the range finder tube.

15 is an elevating arc, driven through a worm gear by motor element 16 of hydraulic transmission gear of which 17 is the pump element driven by a flexible shaft 18 from a source of power. The speed of the pump is kept constant, and the delivery and consequently the speed of the motor 16 can be varied by a lever 19.

In Fig. 3, 20 is a training worm, 21 a worm wheel secured to the fixed part of the mounting, 22 the motor element driving the worm, 23 the pump element of hydraulic transmission gear driven by a flexible shaft 24 from the source of power. The speed of the pump is kept constant and the delivery and consequently the speed of the motor 22 can be varied by a quadrant shaped lever 25.

In Figs. 4 and 5, 26 is a hand wheel controlling the pump 17 and 27 is a hand wheel controlling the pump 23 while 28 is a hand wheel operating the range finder and sight setting gear. The arrangement shown is designed to be worked by two men one of whom looks through the eye pieces 10 and 11 and manipulates the wheels 26 and 28 while the other looks through the eye piece 14 and manipulates the handle 27.

It is convenient, though not indispensable, to place as is shown the two operators with their backs to the target, this arrangement allowing a more compact form of mechanism. The one operator, as will be hereinafter explained, by turning the wheel 26 causes the gun to follow the target in elevation carrying with it the sights, and he at the same time by means of the wheel 28 gives the necessary angle of elevation to the sights. The other operator by turning the wheel 27 causes the gun to follow the target in direction also carrying the sights with it.

The range finder 1 can be deflected around a pivot 29 (Fig. 6) by means of a bell crank 30 as hereinafter described.

The hand wheel 28 operates the range finder prism in the well known manner and at the same time rotates the spindle 31. This spindle has a universal joint 32 placed immediately under the deflection pivot 29, thus allowing relative angular movement of the range finder and the sighting gear. On the spindle 31 is fitted a worm rotating a worm wheel 331 which in turn rotates a cam 341 (Fig. 7). This cam bears on a component of the casting 4 (Fig. 12) and it is evident that its rotation will produce a relative angular movement between 2 and 4 around the trunnions 3. The cam 341 is cut to suit the range finder scale, the angular movement between 2 and 4 being the tangent angle of elevation $\epsilon$ for the given range with the given gun. On the spindle 31 is mounted another worm rotating a worm wheel 32 which in turn rotates a groove cam 33. This cam gives movement to a slider 34, the cam being so cut that the movement of the slider is proportional to the time of flight of the projectile. This slider rotates on its pivot 35 a grooved piece 36 the angular movement of which is also proportional to the time of flight.

37 is a frame slidably mounted on guides 38, 38, and carrying in it two pieces 39, 40, so mounted as to be slidable in a direction at right angles to its own line of motion.

41 is a screw traversing the frame 37 by means of the hand wheel 26 (see Fig. 11).

42 is a grooved piece carried by the box 2 in a plane parallel to the guides 38 but inclined to them at a suitable angle in the same plane. The piece 39 engages this groove by a projection 43, and it will be seen that if 37 is traversed, the piece 39 gets a motion parallel to the plane of the paper proportional to the movement of 37 and the inclination of the groove 42. The piece 39 has a groove 44 which engages a slider 45 passing out through the trunnion 3 and operating the pump lever 19 (Fig. 4). The motion of the frame 37 is therefore directly proportional to the motion of 45 and hence to the motion of the lever 19 and to the speed of the elevating motor 16 and so to the speed of elevation of the gun.

The piece 40 engages the groove in 36 by a projection 46, and it will be seen that if 37 is traversed 40 gets a motion parallel to the plane of the paper proportional to the movement of 37 and the angle of inclination of the groove in 36, that is, proportional to the speed of elevation of the gun, say $\omega_1$ and to the time of flight $t$ or proportional to $\omega_1 t$.

The piece 40 engages a projection $46^x$ on a wedge shaped piece 47 (see Figs. 12 and 14) which is mounted in the casting 4 and movable parallel to the axis of the trunnions 3, 5 and on which rests the range cam 341. It will be evident that the movement of this wedge will rotate the box 2 relatively to the casting 4, the wedge being so proportioned that this angle is equal to $\omega_1 t$. The projection $46^x$ is suitably prolonged to make allowance for this angular movement.

It will be evident from the drawing that when either $\omega_1$ or $t$ is zero the amount of deflection transmitted to the sight is also zero, since if $t=0$ the groove in 36 is parallel to the guides 38 and if 37 is in its central position the displacement of 40 is also zero, no matter what the inclination of the groove in 36. It will also be evident that the motion of 37 from its central position in either direction corresponds to the sense of rotation of the motor and hence of the gun, and that the angle $\omega_1 t$ is positive or negative depending on this sense. Assuming then that the range finder is set to a given range of target and that the speed of elevation positive or negative is adjusted to follow the target, it will be seen that the gun is elevated and with it the casting 4 around its own trunnions at that speed, the box 2 being rotated at the same speed of elevation but displaced relatively to 4 by an angle $= \varepsilon + \omega_1 t$. As the angle $\varepsilon$ varies with the altitude of the target, becoming zero at 90° elevation for all ranges, we may make this correction for altitude by forming the cam 341 as shown, where the correct value of $\varepsilon$ for any angular displacement of the cam is proportional to the axial distance from one of its faces real or imaginary, and suitably rounding the wedge 47. If the gun is to be used at an elevation of 90°, one end of this cam becomes a circle concentric with the spindle, so that any movement due to range produces no angular movement between 2 and 4 in that position. The cam 341 is therefore mounted slidably on its spindle 48 and is kept by a spring 49 pressed against a suitably shaped plunger 50 carried by the casting 4. This plunger 50 carries a roller 51 which bears against a cam face 52 fixed to the pivoting part of the gun mounting.

It will be seen that as the casting 4 is elevated the roller 51 presses back the plunger and hence the cam thereby suitably decreasing the angle $\varepsilon$; 2 and 4 may be held together by a spring connection if necessary.

The training of the gun is controlled in a manner similar to that employed for the elevation and it is therefore only necessary to briefly describe the parts of it which do not differ from the elevating control.

53 is a fixed groove giving motion to the piece 54, which in turn moves the slider 55 to give motion to the pump lever 25.

56 is a grooved piece set proportional to the time of flight by the slider 34 used for the elevating gear; 57 is a piece getting a movement proportional to the time of flight and to the speed of the training motor and therefore to the speed of the training of the gun about its vertical pivot, or to $\omega_2 t$ where $\omega_2$ is the angular speed of the gun about its vertical pivot, considering for the time being targets at small altitudes only. 57 has a groove 58 which engages one arm of the bell crank 30, the other arm of which engages with the range finder 1. The proportions of this bell crank are so arranged that it rotates the range finder and sights through an angle equal to $\omega_2 t$. As before, it will be seen that the movement of the sight is correctly derived as to sense and amount from the movement of the hand wheel 27.

It has before been explained that for targets at a high elevation it is necessary for a given range and speed of target and hence a given deflection angle on the sights, to increase the velocity of training so as to keep the gun on the target in the ratio $$\frac{1}{\cos.\phi}$$

where $\varphi$ is the angle of elevation of the gun. To carry this into effect, we make the lever controlling the training pump in the form of a quadrant pivoted about one radial end and having its center 59, Fig. 1, coincident with the axis of the trunnions 3. The slider 55 moving this lever acts on it at a constant radius $r$ from the center 59, its point of engagement with the gun at zero elevation being at the point 60. As the gun with the sight is elevated the slider traverses a circular path 60, 61, so that when the angle of elevation has become say 45° the point of contact has moved to 61. It will now be clear that the effect on the lever of a given movement of the slider has been increased in the proportion of $$\frac{1}{\cos.45°},$$

since the effective leverage is now $r \cos.45°$, and hence the angular movement increases in the given proportion.

The details of the quadrant shaped lever and its connection are shown more clearly in Figs. 6 and 10 where 25 is the lever with pivots at 62 and 63. 64 is the attachment to the pump, and 65 is a ball movable in an undercut circular groove in the lever. The end of the slider 55 which embraces the ball and so deflects the lever is shown in section.

In what has preceded we have assumed that the range finder is placed horizontally as shown and described in our drawings, but we may also use a range finder with a base line at any angle, preferably at right angles to the position described (see Figs. 15 and 16). In this case we preferably turn the eye piece or eye pieces through a right angle from the first so that the axes of the eye pieces are parallel with the trunnion around which the whole gear rotates, and as nearly coincident therewith as convenient. We also preferably provide an extra telescope similar to the training member's telescope, and an extra man to maneuver the gun in elevation, the range finder member being then wholly occupied with taking the range and thereby setting the sights.

In Fig. 15 the range finder tube described in the previous figures is replaced by a member 66 which may be of any suitable section adapted to receive the two telescopes and the range finder and to be actuated in the same manner as was the range finder before. 67 is the range finder with coincidence eye piece 68, windows 69, 69, and hand wheel 70. The motion of the hand wheel is communicated to the sights precisely as before. We may further arrange to move the range finder and sights independently by a small amount in two directions at right angles to one another for the purpose of initial alinement with the gun, for correction of errors in workmanship, or in connection with observation of fire or drift of projectile but this forms no part of our present invention and is not shown in the drawings.

What we claim is:—

1. The combination of a gun cradle, trunnions fixed to the cradle, bearings for the trunnions, a support for the bearings, a range finder carried by the support, range finding mechanism carried by the range finder and means whereby the movement of the range finding mechanism varies the angle between the axis of the range finder and the axis of the trunnions.

2. The combination of a gun cradle, trunnions fixed to the cradle, bearings for the trunnions, a support for the bearings, a range finder carried by the support, a sight fixed to the range finder, range finding mechanism carried by the range finder and means whereby the movement of the range finding mechanism varies the angle between the line of sight and the axis of the trunnions.

3. In sighting mechanism, the combination of a part moved proportionally to the angular velocity of the gun in elevation, a part moved proportionally to the time of flight of the projectile, means for combining the two movements, and means for applying the resultant movement to deflect the sight line.

4. In sighting mechanism, the combination of a slide, means for causing the slide to be moved in a straight line for a distance proportional to the angular velocity of the gun in elevation, a guide pivoted to the slide, means for rotating the guide about its pivot proportionally to the time of flight of the projectile, a second slide carried by the first and free to move relatively to it in a direction at right angles to its line of movement, a projection on the second slide engaging with the guide, and means for causing the movement of the second slide to deflect the sight line.

5. In sighting mechanism, the combination of a part moved proportionally to the angular velocity of the gun in azimuth, a part moved proportionally to the time of flight of the projectile, means for combining the two movements, and means for applying the resultant movement to deflect the sight line.

6. In sighting mechanism, the combination of a slide, means for causing the slide to be moved in a straight line for a distance proportional to the angular velocity of the gun in azimuth, a guide pivoted to the slide, means for rotating the guide about its pivot proportionally to the time of flight of the projectile, a second slide carried by the first and free to move relatively to it in a direction at right angles to its line of movement, a projection on the second slide engaging with the guide, and means for causing the movement of the second slide to deflect the sight line.

7. In sighting mechanism, the combination of a part moved proportionally to the angular velocity of the gun in azimuth, a part moved proportionally to the time of flight of the projectile, means for combining the two movements, means for applying the resultant movement to deflect the sight line, and means for automatically varying the angular velocity of the mounting about its vertical pivot to suit the altitude of the target.

8. In sighting mechanism, the combination of a slide, means for causing the slide to be moved in a straight line for a distance proportional to the angular velocity of the gun in azimuth, a guide pivoted to the slide, means for rotating the guide about its pivot proportionally to the time of flight of the projectile, a second slide carried by the first and free to move relatively to it in a direction at right angles to its line of movement, a projection on the second slide engaging with the guide, means for causing the movement of the second slide to deflect the sight line, and means for automatically varying the angular velocity of the mounting about its vertical pivot to suit the altitude of the target.

9. In a gun mounting the combination of sights, means for varying the elevation of the sights and a part by which the gun is maneuvered in elevation and the sights are simultaneously set at the angle to the bore of the gun required for the elevation and the rate of movement of the gun.

10. In a gun mounting, the combination of sights, means for varying the elevation of the sights and a part by which the gun is maneuvered in azimuth and the sights are simultaneously set at the deflection angle required for the elevation and for the rate of movement of the gun.

11. The combination of a gun cradle, a range finder, a part free to rotate on trunnions and connected to and turning with the cradle, a second part free to rotate on the same trunnions and connected to and turning with the range finder, and mechanism turning the two parts relatively to each other to give the required deflection.

REGINALD H. S. BACON.
ROBERT REDPATH.

Witnesses:
ARTHUR B. INSTONE,
WILLIAM JONES.